US012610143B2

(12) United States Patent
Shibata

(10) Patent No.: US 12,610,143 B2
(45) Date of Patent: *Apr. 21, 2026

(54) IMAGE STABILIZATION CONTROL APPARATUS AND METHOD, AND STORAGE MEDIUM

(71) Applicant: CANON KABUSHIKI KAISHA, Tokyo (JP)

(72) Inventor: Nobuhiro Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 18/454,321

(22) Filed: Aug. 23, 2023

(65) Prior Publication Data

US 2024/0073526 A1 Feb. 29, 2024

(30) Foreign Application Priority Data

Aug. 30, 2022 (JP) ................................ 2022-137103

(51) Int. Cl.
*H04N 23/68* (2023.01)
*H04N 23/667* (2023.01)
(52) U.S. Cl.
CPC ......... *H04N 23/687* (2023.01); *H04N 23/667* (2023.01)
(58) Field of Classification Search
None
See application file for complete search history.

(56) References Cited

U.S. PATENT DOCUMENTS

2019/0222763 A1* 7/2019 Takayanagi .......... H04N 23/663
2023/0292007 A1* 9/2023 Ito ........................ H04N 23/683
2024/0080562 A1* 3/2024 Jota .................... H04N 23/6812

FOREIGN PATENT DOCUMENTS

JP 2014186344 A 10/2014
JP 6410431 B2 10/2018

OTHER PUBLICATIONS

The above document was cited in a British Search Report issued on Feb. 14, 2024 , that issued in the corresponding British Patent Application No. GB2312142.9.
Supplementary Disclosures of Application No. GB2312142.9; Camera Body Titles & Abstracts, Feb. 13, 2024 (5 pages).
Related U.S. Appl. No. 18/454,332, filed Aug. 23, 2023, Nobuhiro Shibata "Image Stabilization Control Apparatus and Method, and Storage Medium".

* cited by examiner

*Primary Examiner* — Paul M Berardesca
(74) *Attorney, Agent, or Firm* — Cowan, Liebowitz & Latman, P.C.

(57) ABSTRACT

An image stabilization control apparatus performs image stabilization by controlling first correction unit that drives a correction lens in an imaging optical system and second correction unit that drives an image sensor by selecting one of control methods including first and second control methods in accordance with whether the imaging optical system is compatible with the first control method, and obtaining correction amounts of the first and second correction unit based on a shake amount and on the selected control method. The first control method is to perform an over-correction using the first correction unit and an inverse-correction using the second correction unit. The second control method is a method to correct the shake amount using a preset ratio for the first and second correction unit.

18 Claims, 12 Drawing Sheets

F I G. 1A
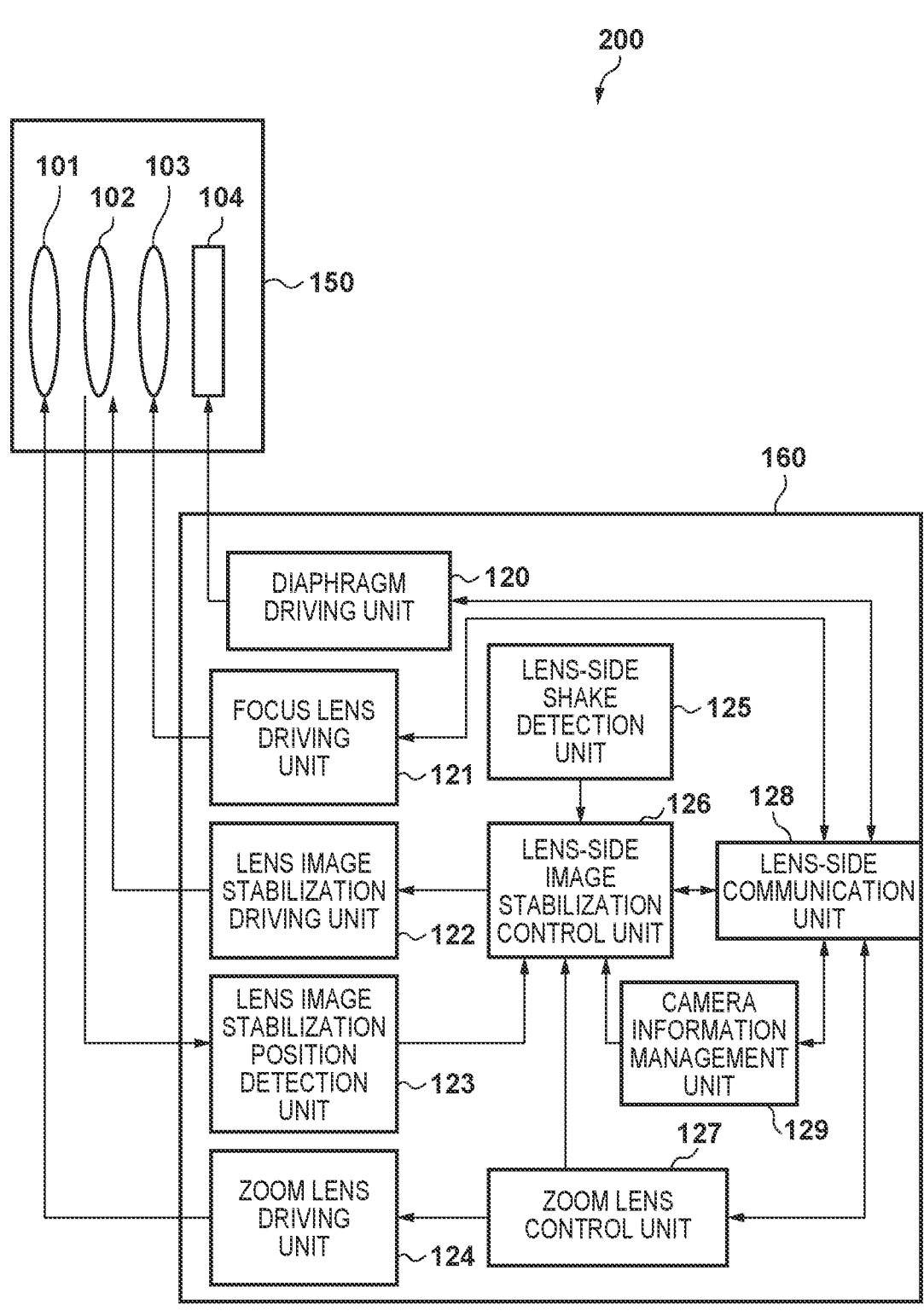

F I G. 2

F I G. 3A

| | COORDINATED CONTROL METHOD 1 | PERIPHERY SHAKE CORRECTION METHOD | | |
|---|---|---|---|---|
| | | A | B | C |
| RATIO | OIS : IBIS = CONSTANT | OIS : IBIS = OVER-CORRECTION · INVERSE-CORRECTION | OIS : IBIS = TRANSITIONS | OIS : IBIS = CHANGES |
| FACTOR FOR DETERMINING RATIO | DETERMINED BASED ON "MAXIMUM MOVABLE RANGES OF OIS AND IBIS" | DETERMINED BASED ON "MAXIMUM PERCENTAGE OF IOS", "MAXIMUM MOVABLE RANGE OF OIS", AND "RANGE IN WHICH OIS IS MOVED AT MAXIMUM PERCENTAGE" | | |
| EXAMPLES OF RATIOS | OIS:IBIS=50%:50% | OIS:IBIS=200%:-100% | OIS:IBIS=200%:-100% → OIS:IBIS=100%:0% | OIS:IBIS= α%:β% |

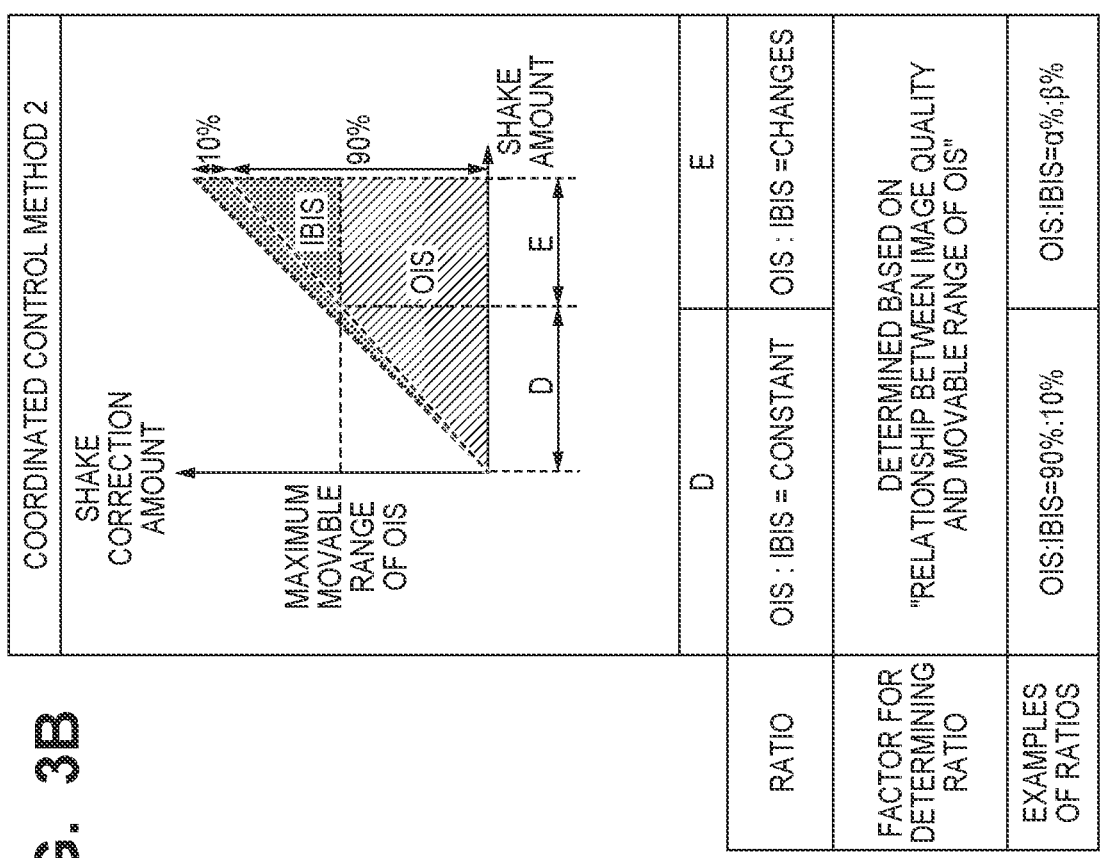
F I G. 3B

F I G. 4

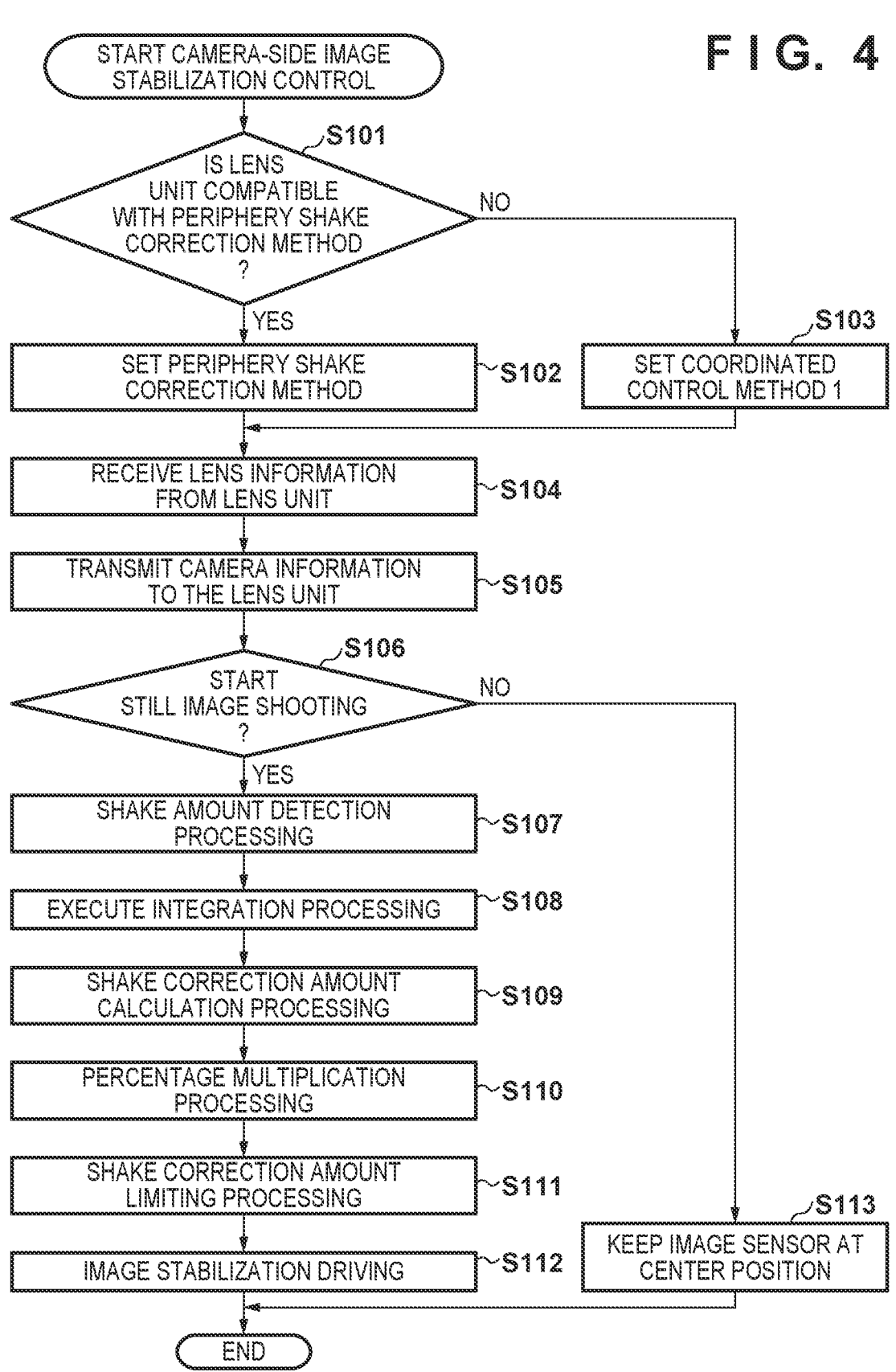

START CAMERA-SIDE IMAGE
STABILIZATION CONTROL

S101
IS LENS
UNIT COMPATIBLE
WITH PERIPHERY SHAKE
CORRECTION METHOD
?

NO

YES

SET PERIPHERY SHAKE
CORRECTION METHOD — S102

SET COORDINATED
CONTROL METHOD 1 — S103

RECEIVE LENS INFORMATION
FROM LENS UNIT — S104

TRANSMIT CAMERA INFORMATION
TO THE LENS UNIT — S105

S106
START
STILL IMAGE SHOOTING
?

NO

YES

SHAKE AMOUNT DETECTION
PROCESSING — S107

EXECUTE INTEGRATION PROCESSING — S108

SHAKE CORRECTION AMOUNT
CALCULATION PROCESSING — S109

PERCENTAGE MULTIPLICATION
PROCESSING — S110

SHAKE CORRECTION AMOUNT
LIMITING PROCESSING — S111

S113
KEEP IMAGE SENSOR AT
CENTER POSITION

IMAGE STABILIZATION DRIVING — S112

END

F I G. 6
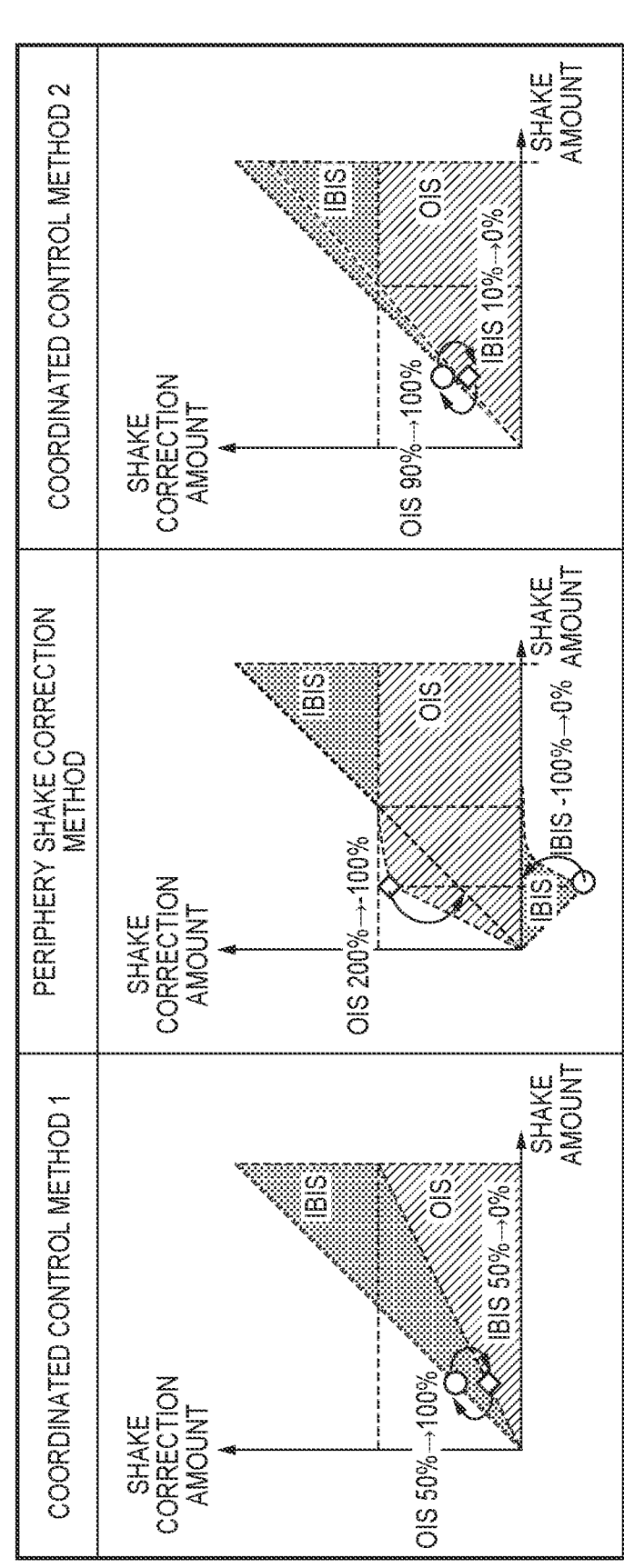

F I G. 7
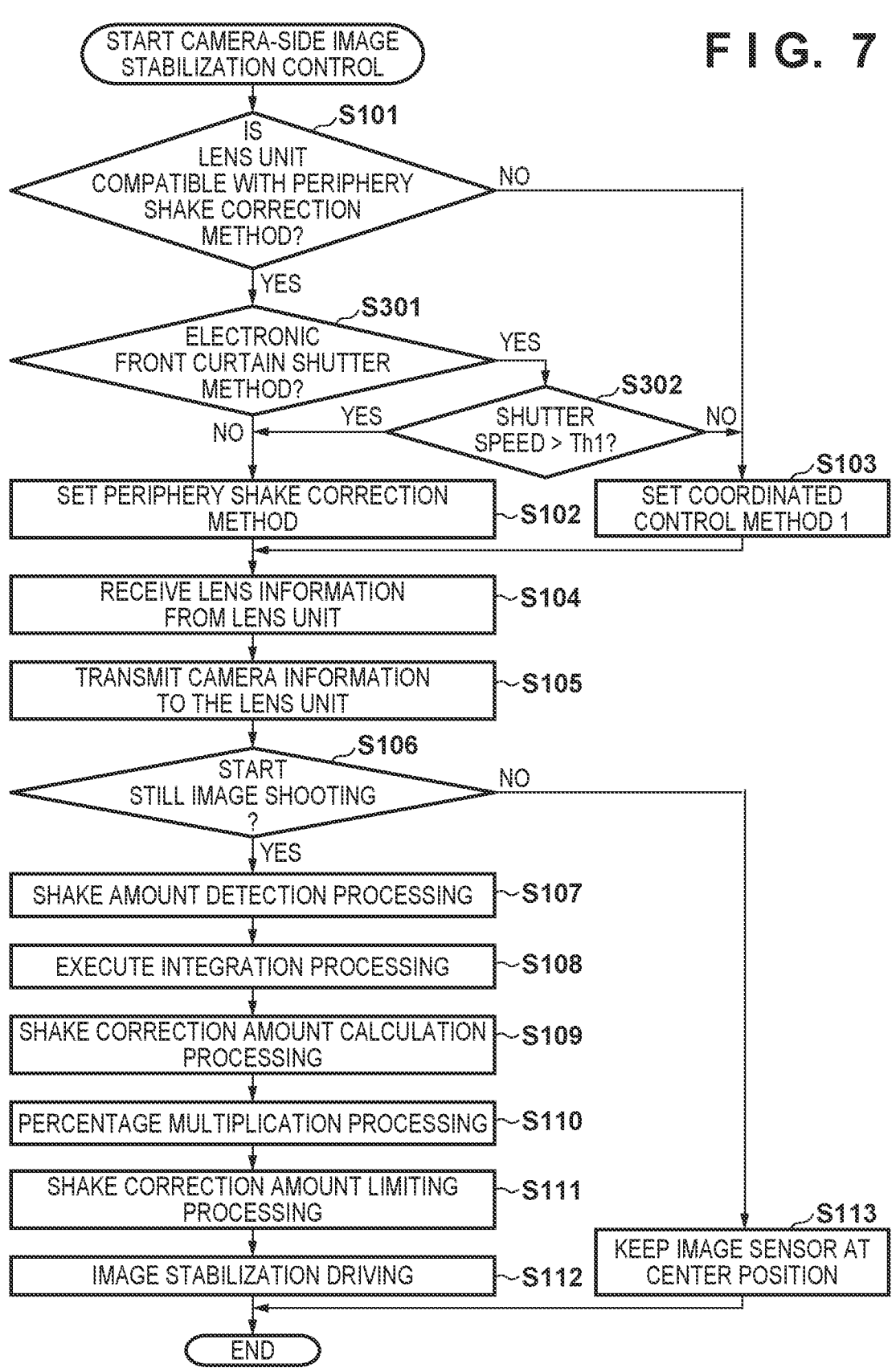

F I G. 8
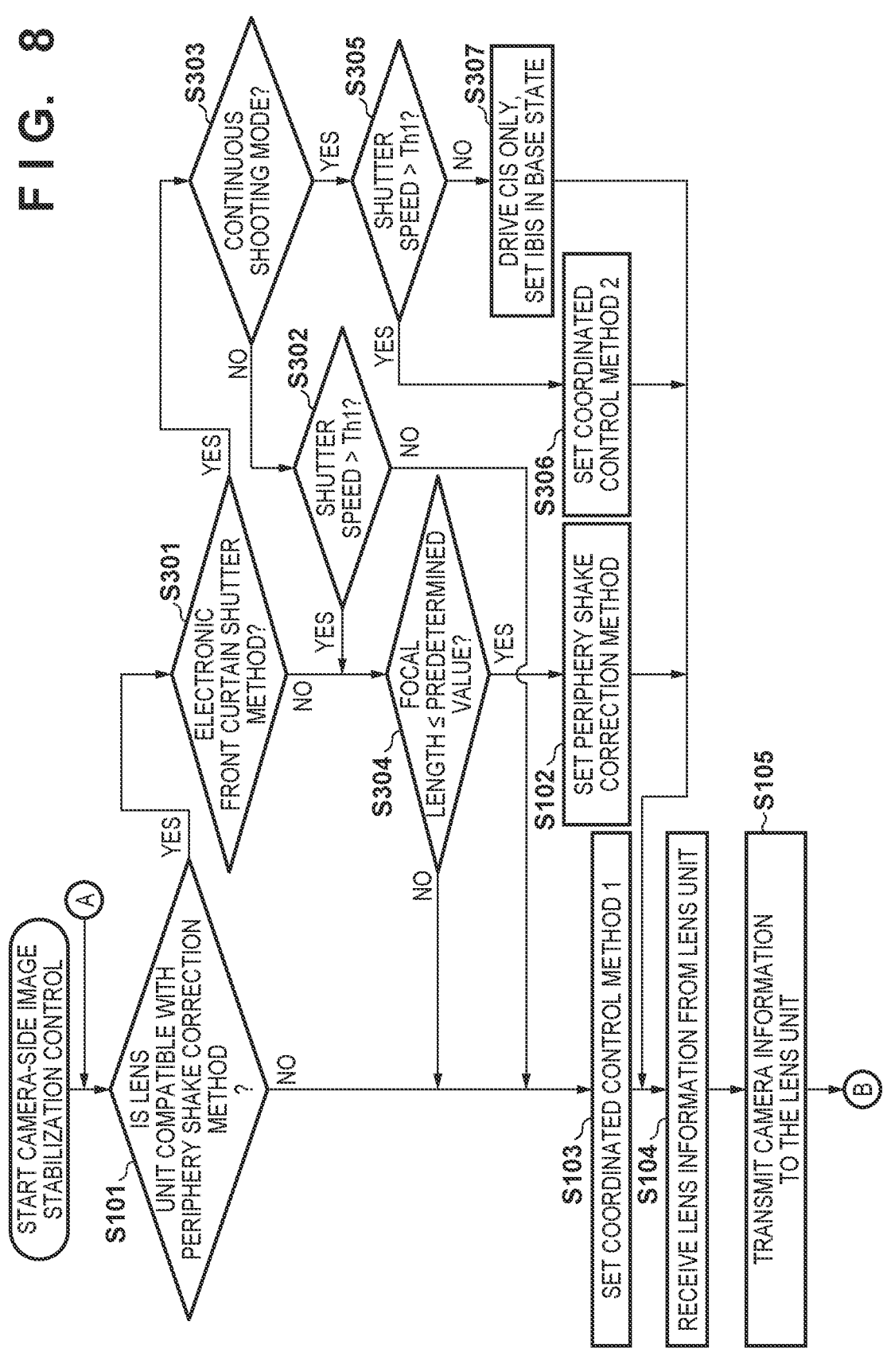

F I G. 10
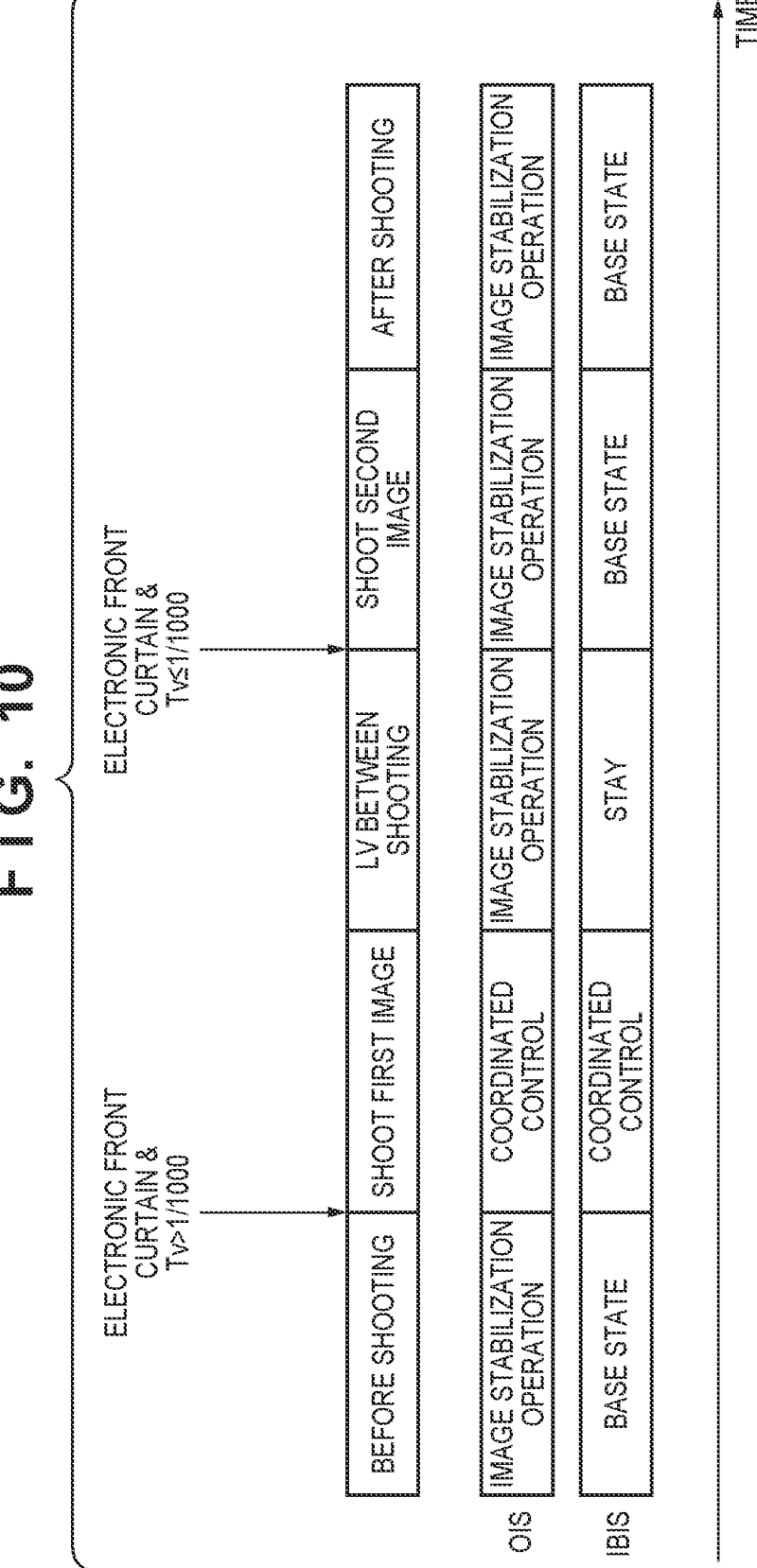

IMAGE STABILIZATION CONTROL APPARATUS AND METHOD, AND STORAGE MEDIUM

BACKGROUND OF THE INVENTION

Field of the Invention

The present invention relates to an image stabilization control apparatus and method, and storage medium.

Description of the Related Art

Recent image capturing apparatuses, such as still cameras and video cameras, typically have an image stabilization function. Especially, an optical image stabilization function comes in the following two types. One is a type that realizes an image stabilization operation mainly by moving a correction lens dedicated for image stabilization on a plane perpendicular to the optical axis (hereinafter referred to as "optical image stabilizer (OIS)"). The other is a type that realizes an image stabilization operation by moving an image sensor on a plane perpendicular to the image sensor (hereinafter referred to as "in-body image stabilizer (IBIS) "").

Meanwhile, known directions of camera shake include pitch shake which is shake around a horizontal axis perpendicular to the optical axis, yaw shake which is shake around a vertical axis perpendicular to the optical axis, and roll shake which is shake around the optical axis, relative to a base orientation of an image capturing apparatus.

IBIS can not only correct pitch shake and yaw shake as it moves the image sensor on a plane perpendicular to the optical axis, but also correct roll shake as it can further move the image sensor in the rotation direction around the optical axis. On the other hand, OIS can correct pitch shake and yaw shake, but cannot correct roll shake even if the correction lens is rotated.

In view of this, by driving OIS and IBIS simultaneously (hereinafter referred to as "coordinated control"), an image stabilization range can be increased with respect to pitch shake and yaw shake compared to a case where only one of them is driven, and in addition, roll shake can be corrected as well. In performing this coordinated control, a correction range can be increased to the maximum by appropriately setting the percentages of a shake correction amount based on OIS and a shake correction amount based on IBIS (see Japanese Patent No. 6410431).

However, with the aforementioned coordinated control, while the image stabilization performance is improved, a shake correction remnant at the periphery of a screen is noticeable. This is because an optimal shake correction amount corresponding to image shake changes with each image height. The change in the shake correction amount with each image height is steeper with the image stabilization operation based on the image sensor, that is to say, IBIS, although it varies in extent depending on the lens characteristics.

Therefore, when the aforementioned two types of image stabilization functions are driven simultaneously, making the percentage of the shake correction amount based on OIS higher than the percentage of the shake correction amount based on IBIS causes the change in the shake correction amount with each image height to be gradual, thereby making the shake correction remnant at the periphery of the screen less noticeable.

In view of the aforementioned features, the shake correction remnant at the periphery of the screen can be minimized by controlling the percentage of the shake correction amount based on OIS to be in a state where it exceeds 100% (hereinafter referred to as "over-correction control"), and controlling the percentage of the shake correction amount based on IBIS in a direction in which a part of the shake correction amount based on OIS that exceeds 100% is cancelled out, that is to say, to be in a state where it is negative (hereinafter referred to as "inverse-correction control").

Such coordinated control that places priority on stability of the image quality at the periphery by performing over-correction control based on OIS and performing inverse-correction control based on IBIS, is hereinafter referred to as a "periphery shake correction method".

Meanwhile, there are cases where the image quality deteriorates depending on a combination of the aforementioned coordinated control and a shutter method.

Specifically, there may be a case where an image capturing apparatus provided with a mechanical shutter performs shooting using a method in which a front curtain operation is performed using an electronic shutter (reset scanning of an image sensor), and a rear curtain operation is performed using the mechanical shutter (hereinafter referred to as an "electronic front curtain shutter method"). Especially, when exposure is performed with a high-speed shutter while correcting roll shake, exposure unevenness becomes significantly noticeable in a case where the image sensor is in an inclined state relative to the mechanical shutter. Furthermore, exposure unevenness becomes noticeable also due to the influence of the brightness/darkness difference between the opposing corners at the periphery of the screen (hereinafter referred to as "shading") associated with a correction operation for pitch shake and yaw shake, in addition to a correction operation for roll shake.

In view of this, in a case where shooting is performed using the electronic front curtain shutter method, deterioration in the image quality can be suppressed by restoring the image sensor to a base state (a central position, and a state where the moving direction of the electronic shutter and the moving direction of the mechanical shutter match) after stopping image stabilization immediately before shooting.

However, when shooting is performed using the electronic front curtain shutter method, the following problem occurs in a case where shake correction is carried out using the periphery shake correction method.

As described above, in order to avoid the occurrence of exposure unevenness in the electronic front curtain shutter method, it is necessary to perform an operation to restore the image sensor to the central position before shooting is started. This operation to restore the image sensor to the central position causes the percentage of the shake correction amount based on IBIS to be 0%. As a result, the shake correction amount based on OIS is changed from the state of over-correction control to 100%.

Such fluctuations in the percentages of the shake correction amounts are steep percentage fluctuations compared to a case where the image sensor is restored to the central position during the coordinated control at percentages lower than 100% that have been calculated from the respective movable ranges of the correction lens and the image sensor. This gives rise to the problem that the motions of the correction lens and the image sensor associated with such steep percentage fluctuations are transmitted to a photographer in the form of vibration due to the law of action and reaction, thereby degrading the usability of the image capturing apparatus and causing shake.

SUMMARY OF THE INVENTION

The present invention has been made in consideration of the above situation, and performs coordinated control in accordance with the lens characteristics.

According to the present invention, provided is an image stabilization control apparatus that performs image stabilization by controlling a first correction unit and a second correction unit, the first correction unit correcting camera shake by driving a correction lens included in an imaging optical system in a direction perpendicular to an optical axis, the second correction unit correcting camera shake by driving an image sensor in a direction perpendicular to the optical axis, the image sensor photoelectrically converting light incident via the imaging optical system and outputting an image signal, the image stabilization control apparatus comprising: an obtainment unit that obtains a shake amount from a detection unit; a selection unit that selects one of a plurality of control methods including a first control method and a second control method that control a ratio between the shake amount to be corrected by the first correction unit and the shake amount to be corrected by the second correction unit; and a calculation unit that obtains a correction amount of at least one of the first correction unit and the second correction unit based on the shake amount and on the control method selected by the selection unit, wherein the first control method is a method which performs an over-correction using the first correction unit in which a correction is made in excess of the shake amount within a range in which the first correction unit can be driven, and which also performs an inverse-correction using the second correction unit for cancelling out an amount that has been over-corrected, the second control method is a method that corrects the shake amount using a preset ratio for the first correction unit and the second correction u across the range in which the shake amount can be corrected, and the selection unit makes the selection in accordance with whether the imaging optical system is compatible with the first control method.

Further, according to the present invention, provided is an image stabilization control method for performing image stabilization by controlling a first correction unit and a second correction unit, the first correction unit correcting camera shake by driving a correction lens included in an imaging optical system in a direction perpendicular to an optical axis, the second correction unit correcting camera shake by driving an image sensor in a direction perpendicular to the optical axis, the image sensor photoelectrically converting light incident via the imaging optical system and outputting an image signal, the image stabilization control method comprising: obtaining a shake amount from a detection unit; selecting one of a plurality of control methods including a first control method and a second control method that control a ratio between the shake amount to be corrected by the first correction unit and the shake amount to be corrected by the second correction unit; and obtaining a correction amount of at least one of the first correction unit and the second correction unit based on the shake amount and on the control method selected in the selecting, wherein the first control method is a method which performs an over-correction using the first correction unit in which a correction is made in excess of the shake amount within a range in which the first correction unit can be driven, and which also performs an inverse-correction using the second correction unit for cancelling out an amount that has been over-corrected, the second control method is a method that corrects the shake amount using a preset ratio for the first correction unit and the second correction unit across the range in which the shake amount can be corrected, and in the selecting, the selection is made in accordance with whether the imaging optical system is compatible with the first control method.

Further, according to the present invention, provided is a non-transitory computer-readable storage medium, the storage medium storing a program that is executable by the computer, wherein the program includes program code for causing the computer to perform an image stabilization control method for performing image stabilization by controlling a first correction unit and a second correction unit, the first correction unit correcting camera shake by driving a correction lens included in an imaging optical system in a direction perpendicular to an optical axis, the second correction unit correcting camera shake by driving an image sensor in a direction perpendicular to the optical axis, the image sensor photoelectrically converting light incident via the imaging optical system and outputting an image signal, the image stabilization control method comprising: obtaining a shake amount from a detection unit; selecting one of a plurality of control methods including a first control method and a second control method that control a ratio between the shake amount to be corrected by the first correction unit and the shake amount to be corrected by the second correction unit; and obtaining a correction amount of at least one of the first correction unit and the second correction unit based on the shake amount and on the control method selected in the selecting, wherein the first control method is a method which performs an over-correction using the first correction unit in which a correction is made in excess of the shake amount within a range in which the first correction unit can be driven, and which also performs an inverse-correction using the second correction unit for cancelling out an amount that has been over-corrected, the second control method is a method that corrects the shake amount using a preset ratio for the first correction unit and the second correction unit across the range in which the shake amount can be corrected, and in the selecting, the selection is made in accordance with whether the imaging optical system is compatible with the first control method.

Further features of the present invention will become apparent from the following description of embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 1A and 1B are block diagrams showing a configuration of a digital camera according to an embodiment of the present invention.

FIG. 2 is a block diagram showing a specific configuration of image stabilization system according to an embodiment.

FIGS. 3A and 3B are schematic diagrams for describing the features of each coordinated control method according to an embodiment.

FIG. 4 is a flowchart of camera-side image stabilization control according to a first embodiment.

FIG. 6 is a schematic diagram for describing a problem that arises due to an operation to restore an image sensor of IBIS to a central position.

FIG. 7 is a flowchart of camera-side image stabilization control according to a second embodiment.

FIG. 8 is a flowchart of camera-side image stabilization control according to a third embodiment.

FIG. 10 is a schematic diagram for describing image stabilization control for a case where continuous shooting of still images is performed using an electronic front curtain shutter method according to the third embodiment.

DESCRIPTION OF THE EMBODIMENTS

Figure 1B:
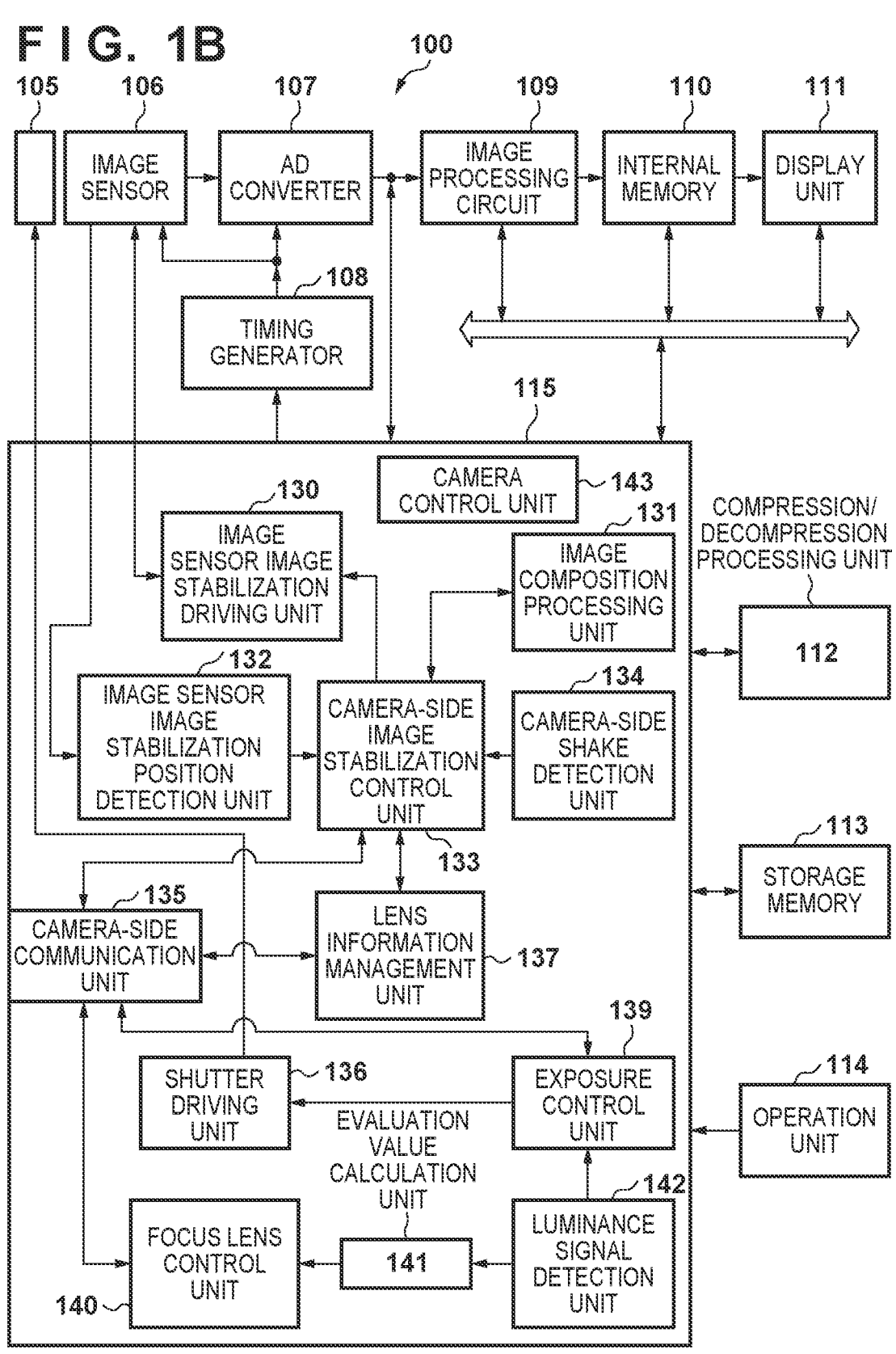

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIGS. 1A and 1B are block diagrams showing a configuration of a digital camera, which is an embodiment of an image capturing apparatus of the present invention; the digital camera is mainly composed of a camera main body 100 and a lens unit 200.

Although the present embodiment will be described in relation to a case where the present invention is implemented on an interchangeable lens digital camera, the present invention may be implemented on an electronic device with a camera function, which may be a camera such as a digital camera and a digital video camera, or may be a mobile telephone equipped with a camera, a computer equipped with a camera, a game device, and so forth. Furthermore, lenses may be configured integrally with the camera main body.

First, a configuration of the lens unit 200 will be described.

The lens unit 200 includes an imaging optical system 150 provided with a zoom lens 101, an image stabilization lens 102, a focus lens 103, and a diaphragm 104, and a lens-side control system 160 that controls the imaging optical system 150.

A movement of the zoom lens 101 in the optical axis direction optically changes the focal length of the imaging optical system 150, thereby altering the angle of view for shooting. The image stabilization lens 102 optically corrects camera shake caused by a shake of the image capturing apparatus by moving in a direction perpendicular to the optical axis. The focus lens 103 optically adjusts the in-focus position by moving in the optical axis direction. The diaphragm 104 is used to adjust the amount of light entering the camera main body 100.

In the lens-side control system 160, a zoom lens control unit 127 receives a zoom operation instruction from an operation unit 114 included in the camera main body 100 via a lens-side communication unit 128, and drives the zoom lens 101 via a zoom lens driving unit 124. As a result, the angle of view (focal length) of the lens unit 200 is altered.

A focus lens driving unit 121 drives the focus lens 103 based on a driving instruction for the focus lens 103 that has been received from the camera main body 100 via the lens-side communication unit 128.

A diaphragm driving unit 120 drives the diaphragm 104 based on an f-number that has been received from the camera main body 100 via the lens-side communication unit 128.

A lens-side shake detection unit 125 detects a shake of the lens unit 200, and outputs information related to the detected shake. A gyroscope is typically used as a sensor component that detects a shake; the gyroscope detects the angular velocity of the shake and outputs the same to a lens-side image stabilization control unit 126.

A lens image stabilization position detection unit 123 detects a position of the image stabilization lens 102 in a direction perpendicular to the optical axis, and outputs the detected position information to the lens-side image stabilization control unit 126.

A camera information management unit 129 holds and manages setting information of the camera main body 100, and information of the current position and the driving limit of an image sensor 106, on the lens unit 200 side.

The lens-side image stabilization control unit 126 obtains a shake correction amount and a correction direction for suppressing a shake based on a shake amount detected by the lens-side shake detection unit 125, the position information of the image stabilization lens 102 detected by the lens image stabilization position detection unit 123, and the information managed by the camera information management unit 129. Then, the lens-side image stabilization control unit 126 controls a lens image stabilization driving unit 122 based on the obtained shake correction amount and correction direction to drive the image stabilization lens 102 by the shake correction amount in the image shake correction direction.

Next, a configuration of the camera main body 100 will be described.

A shutter 105 is a mechanical focal-plane shutter, and includes a front curtain and a rear curtain. A shutter driving unit 136 drives the shutter 105. During shooting of moving images, the front curtain and the rear curtain are in a state where they are fixed at a position that is outside the optical path (an exposure position), allow passage of light entering via the lens unit 200, thereby causing an image of the light to be formed on the image sensor 106.

Furthermore, during shooting of a still image, while the rear curtain is in a state where it is held at the exposure position, the front curtain makes an exposure movement whereby it moves from a light-blocking position on the optical path to the exposure position, thereby allowing passage of light. Then, after a preset exposure period (shutter speed) has elapsed since the movement of the front curtain, the rear curtain makes a light-blocking movement whereby it moves from the exposure position to the light-blocking position; consequently, an exposure operation associated with single shooting is completed. An exposure operation for adjusting an exposure period with use of the aforementioned front curtain and rear curtain of the shutter 105 is hereinafter referred to as a "mechanical shutter method".

Furthermore, shutter methods include, in addition to the mechanical shutter method, a method that controls an exposure period based on electrical reset scanning of the image sensor 106 (an electronic front curtain) and readout of signals from the image sensor 106 (an electronic rear curtain), which is hereinafter referred to as an "electronic shutter method".

In addition, as stated earlier, there is an electronic front curtain shutter method that controls an exposure period based on a combination of electrical reset scanning of the image sensor 106 (the electronic front curtain) and a movement of the rear curtain of the shutter 105.

Light that has passed through the imaging optical system 150 and the shutter 105 is received by the image sensor 106 that uses, for example, a charge-coupled device (CCD) or a complementary metal-oxide-semiconductor (CMOS) sensor, and photoelectrically converted into electrical signals. Note that the image sensor 106 of the present embodiment has a function of optically correcting camera shake by moving in a direction perpendicular to the optical axis.

An AD converter 107 generates image data by executing noise reduction processing, gain adjustment processing, and AD conversion processing with respect to the electrical signals (image signals) that have been read out from the image sensor 106. In accordance with a command from a camera control unit 143, a timing generator 108 controls driving timings of the image sensor 106 and driving timings of the AD converter 107. An image processing circuit 109 executes pixel interpolation processing, color conversion processing, and the like with respect to the image data output from the AD converter 107, and then transmits the processed image data to an internal memory 110.

A display unit 111 displays image data, shooting information, and the like held in the internal memory 110.

A compression/decompression processing unit 112 executes compression processing with respect to the image data stored in the internal memory 110 in accordance with an image format, and stores the resultant image data into a storage memory 113. Furthermore, it reads out the compressed image data from the storage memory 113, executes decompression processing, and stores the result thereof into the internal memory 110. The storage memory 113 stores various types of data, such as parameters, in addition to the image data.

The operation unit 114 is a user interface for a user to issue various types of instructions including a zoom operation instruction and a shooting instruction, and to perform various types of menu operations and a mode switching operation.

In a camera-side control system 115, the camera control unit 143 is composed of a calculation apparatus, such as a central processing unit (CPU), and controls the entirety of the image capturing apparatus by executing various types of control programs stored in the internal memory 110 in accordance with a user operation performed via the operation unit 114. The control programs include, for example, programs for performing zoom control, image stabilization control, automatic exposure control, automatic focus adjustment control, processing for detecting a face of a subject, and so forth. In the case of an interchangeable lens camera, a camera-side communication unit 135 and the lens-side communication unit 128 perform control related to information communication between the camera main body 100 and the lens unit 200.

A luminance signal detection unit 142 detects the luminance of the subject and the entire image from the image data output from the AD converter 107.

An exposure control unit 139 calculates exposure values (an f-number and an exposure period) based on luminance information obtained by the luminance signal detection unit 142, and outputs the f-number to the diaphragm driving unit 120 of the lens unit 200 via the camera-side communication unit 135, and the exposure period to the shutter driving unit 136. Furthermore, based on a user operation performed via the operation unit 114 or on the sensitivity that has been automatically set in accordance with the luminance, the exposure control unit 139 also concurrently performs control for the gain adjustment processing executed by the AD converter 107 with respect to image capturing signals that have been read out from the image sensor 106. Consequently, automatic exposure control (AE control) is performed.

An evaluation value calculation unit 141 extracts specific frequency components from the luminance information obtained by the luminance signal detection unit 142, and calculates contrast evaluation values based thereon. A focus lens control unit 140 issues a command for driving the focus lens 103 by a predetermined driving amount across a predetermined range, and also obtains the contrast evaluation values at the respective focus lens positions, which are the results of calculation performed by the evaluation value calculation unit 141. Then, it calculates a defocus amount according to a contrast AF method based on the focus lens position corresponding to the vertex of the transformation curve of the contrast evaluation values, and transmits the defocus amount to the focus lens driving unit 121 of the lens unit 200 via the camera-side communication unit 135. The focus lens driving unit 121 drives the focus lens 103 by the defocus amount; as a result, automatic focus control (AF control) for focusing a light beam on an image capturing surface of the image sensor 106 is performed. Note that although the contrast AF method has been described above, a phase-difference AF method may also be used. As the phase-difference AF method is known, a description thereof is omitted.

A camera-side shake detection unit 134 detects a shake of the camera main body 100, and outputs information related to the detected shake. Similarly to the lens-side shake detection unit 125, a gyroscope is typically used as a sensor component that detects vibration of a shake; the gyroscope detects the angular velocity of the shake and outputs the same to a camera-side image stabilization control unit 133.

An image sensor image stabilization position detection unit 132 detects a position of the image sensor 106 in a direction perpendicular to the optical axis, and outputs detected position information to the camera-side image stabilization control unit 133.

A lens information management unit 137 holds and manages optical characteristics information, as well as information related to the current position and the driving limit, of the image stabilization lens 102 on the camera main body 100 side.

The camera-side image stabilization control unit 133 obtains a shake correction amount and a correction direction for suppressing a shake based on the shake amount detected by the camera-side shake detection unit 134, the position information of the image sensor 106 detected by the image sensor image stabilization position detection unit 132, and the information managed by the lens information management unit 137. Then, based on the obtained shake correction amount and correction direction, the camera-side image stabilization control unit 133 controls an image sensor image stabilization driving unit 130 to drive the image sensor 106 by the shake correction amount in the image shake correction direction.

An image composition processing unit 131 converts the shake correction amount calculated by the camera-side image stabilization control unit 133 into an amount of image displacement between images by adding an appropriate coefficient thereto. A camera shake that appears between images can be corrected by appropriately controlling a scan range of an image to be shot next based on this amount of image displacement. Continuous execution of this operation achieves electronic image stabilization that suppresses image deterioration caused by a camera shake.

Figure 2:
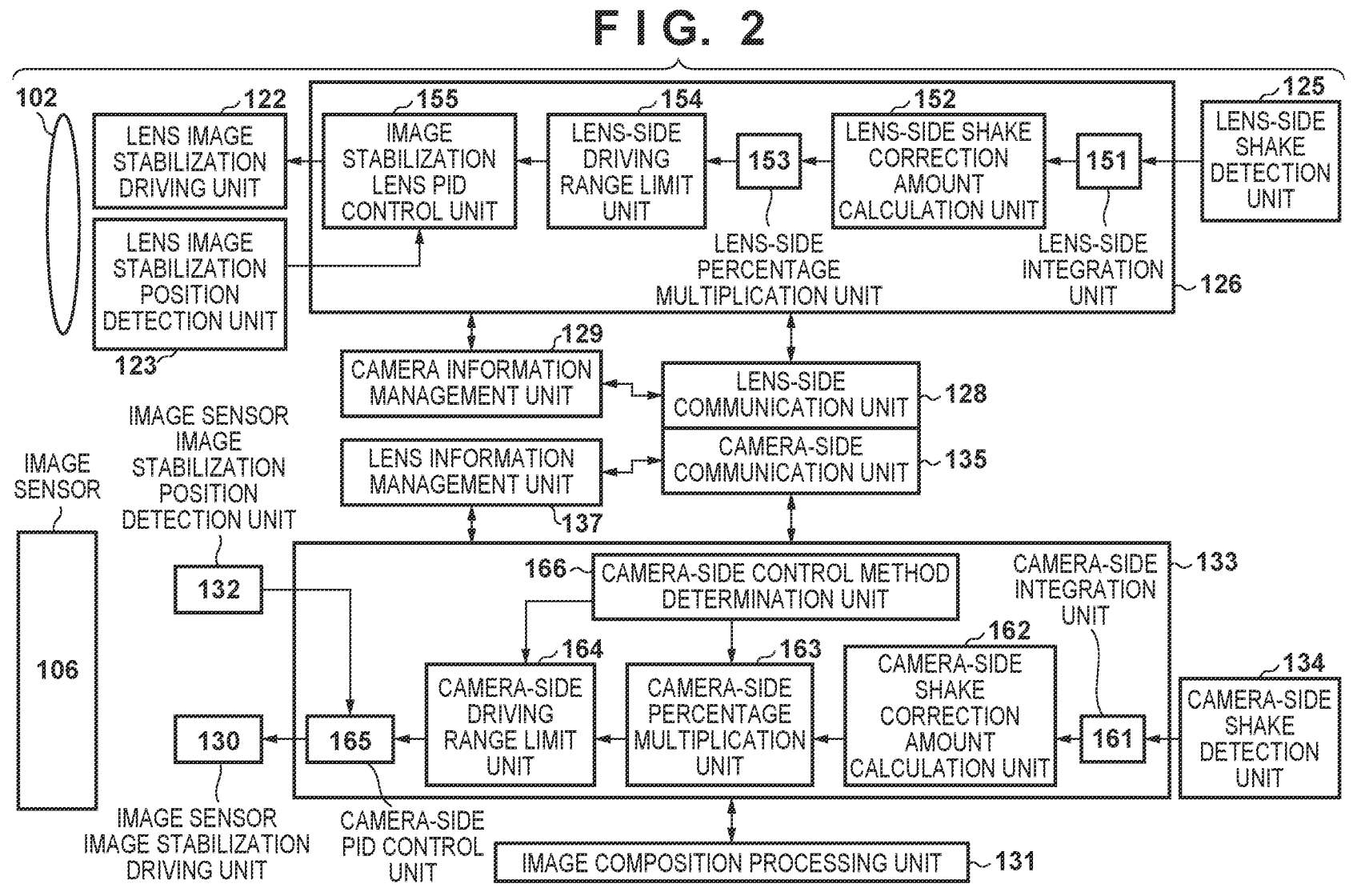

FIG. 2 is a block diagram showing specific configurations of an image stabilization system (OIS) on the lens unit 200 side and an image stabilization system (IBIS) on the camera main body 100 side.

First, the image stabilization system (IBIS) on the camera main body 100 side will be described.

The angular velocity of a shake detected by the camera-side shake detection unit 134 is converted into a shake angle by undergoing integration processing executed by a camera-side integration unit 161 of the camera-side image stabilization control unit 133. A camera-side shake correction amount calculation unit 162 performs a calculation to obtain a shake correction amount with which the shake angle is cancelled out in consideration of the frequency band of the shake angle and the range in which the image sensor 106 can be driven.

A camera-side control method determination unit 166 makes a determination for selecting a coordinated control method based on IBIS and OIS (one of a periphery shake correction method, a coordinated control method 1, and a coordinated control method 2). Note that the details of each method and the details of processing executed by the camera-side control method determination unit 166 will be described later.

A camera-side percentage multiplication unit 163 multiplies the shake correction amount obtained by the camera-side shake correction amount calculation unit 162 by the percentage of the shake correction amount pertaining to IBIS based on the coordinated control method selected by the camera-side control method determination unit 166.

A camera-side driving range limit unit 164 places a limit on the shake correction amount in a case where a target position to which the image sensor 106 is to be driven by the shake correction amount exceeds the driving limit of the image sensor 106.

A camera-side PID control unit 165 performs feedback control using the current position of the image sensor 106 obtained by the image sensor image stabilization position detection unit 132 so as to track the target position to which the image sensor 106 is to be driven. Note that as PID control is a common technique, the details thereof are omitted. Furthermore, a feedback control method is not limited to PID control.

In addition, the camera-side image stabilization control unit 133 calculates an amount of image displacement between images, and instructs the image composition processing unit 131 to perform electronic image stabilization control.

Next, the image stabilization system (OIS) on the lens unit 200 side will be described.

The angular velocity of a shake detected by the lens-side shake detection unit 125 is converted into a shake angle by undergoing integration processing executed by a lens-side integration unit 151 of the lens-side image stabilization control unit 126. A lens-side shake correction amount calculation unit 152 performs a calculation to obtain a shake correction amount with which the shake angle is cancelled out in consideration of the frequency band of the shake angle and the range in which the image stabilization lens 102 can be driven.

A lens-side percentage multiplication unit 153 multiplies the shake correction amount obtained by the lens-side shake correction amount calculation unit 152 by the percentage of the shake correction amount pertaining to OIS based on the coordinated control method based on IBIS and OIS selected by the camera-side control method determination unit 166.

A lens-side driving range limit unit 154 places a limit on the shake correction amount in a case where a target position to which the image stabilization lens 102 is to be driven by the shake correction amount exceeds the driving limit of the image stabilization lens 102.

An image stabilization lens PID control unit 155 performs feedback control using the current position of the image stabilization lens 102 obtained by the lens image stabilization position detection unit 123 so as to track the target position to which the image stabilization lens 102 is to be driven. Note that as PID control is a common technique, the details thereof are omitted.

Furthermore, a feedback control method is not limited to PID control.

With reference to FIGS. 3A and 3B, the following describes the types of aforementioned coordinated control that drives OIS and IBIS simultaneously, and the features of image stabilization under each type of coordinated control, according to the present embodiment. In each graph shown in FIGS. 3A and 3B, an X-axis represents a shake amount in the range in which correction can be performed based on OIS and IBIS, whereas a Y-axis represents a shake correction amount.

Among the three types of control methods shown in FIGS. 3A and 3B, the coordinated control methods 1 and 2 are methods that perform control so that the direction of relative movement of a subject image and the image sensor based on OIS matches the direction of relative movement of a subject image and the image sensor based on IBIS.

In the coordinated control methods 1 and 2, the percentages of the shake correction amounts that are respectively based on OIS and IBIS are percentages lower than 100%, and are calculated from the respective movable ranges of OIS and IBIS. That is to say, neither the correction amount based on OIS nor the correction amount based on IBIS exceeds the correction amount corresponding to the detected shake (the correction amount for correcting the detected shake).

On the other hand, in the periphery shake correction method, the percentage of the shake correction amount based on OIS is controlled to be in a state where it exceeds 100% (hereinafter referred to as "over-correction control"). Furthermore, the camera shake is corrected by controlling the percentage of the shake correction amount based on IBIS in a direction in which a part of the shake correction amount based on OIS that exceeds 100% is cancelled out, that is to say, to be in a state where it is negative (hereinafter referred to as "inverse-correction control"). That is to say, the correction amount based on OIS exceeds the correction amount corresponding to the detected shake, whereas the correction amount based on IBIS has a sign that is the inverse of the sign of the correction amount corresponding to the detected shake (driving direction is opposite). The details will be described below.

In image stabilization based on the coordinated control method 1, correction is performed by an amount equal to the shake amount, and thus the relationship between the shake amount and the shake correction amount is $Y=X$. With this taken into account, the ratio between the shake correction amount based on OIS and the shake correction amount based on IBIS is presented. In the coordinated control method 1, each shake correction amount increases, while the ratio between the shake correction amount based on OIS and the shake correction amount based on IBIS remains at a constant ratio, within the maximum movable range of the image stabilization lens 102 driven based on OIS. This constant ratio is determined from the ratio between the maximum movable range of the image stabilization lens 102 driven based on OIS and the maximum movable range of the image sensor 106 driven based on IBIS. For example, if the maximum movable ranges of the image stabilization lens 102 and the image sensor 106 are the same, the constant ratio is 50%. Note that the ratio between the maximum movable ranges does not denote the ratio between the distances over which the image stabilization lens 102 and the image sensor 106 can be actually driven, but denotes the ratio between the distances over which the relative movement of a subject image and the image surface of the image sensor can occur as a result of driving of the image stabilization lens 102 and the image sensor 106.

In shake correction according to the periphery shake correction method, over-correction control in which the shake correction amount based on OIS exceeds the shake amount is performed within the maximum movable range of the image stabilization lens 102 driven based on OIS. Meanwhile, inverse-correction control is performed in which the shake correction amount based on IBIS is a shake correction amount that cancels out an excess part of the shake correction amount based on OIS that exceeds the shake amount.

As stated earlier, an optimal shake correction amount corresponding to image shake changes with each image height. The change in the shake correction amount with each image height is steeper with IBIS, although it varies in extent depending on the lens characteristics. Therefore, when the aforementioned two types of image stabilization functions are driven simultaneously, making the percentage of the shake correction amount based on OIS higher than the percentage of the shake correction amount based on IBIS causes the change in the shake correction amount with each image height to be gradual, thereby making the shake correction remnant at the periphery of the screen less noticeable.

For this reason, in the periphery shake correction method, the shake correction remnant at the periphery of the screen is minimized by performing over-correction control with OIS, and performing inverse-correction control with IBIS. In the inverse-correction control, the image sensor is moved in the same direction as the direction in which the relative movement of a subject image and the image capturing surface of the image sensor occurs in association with the shake; therefore, the inverse-correction control is control that further increases the shake without the over-correction based on OIS.

Especially, provided that a section of the shake amount in which the image stabilization lens 102 is moved so that the shake correction amount based on OIS is at the maximum percentage is section A, and a remaining section within the maximum movable range of the image stabilization lens 102 is section B, section A is a section in which OIS and IBIS respectively perform the over-correction and the inverse-correction, whereas section B is a section in which an excess shake correction amount associated with this over-correction and the shake correction amount associated with the inverse-correction gradually decrease.

Furthermore, provided that a section of the shake amount outside the maximum movable range of the image stabilization lens 102 is section C, as it is not possible to perform further image stabilization based on OIS in section C, only the shake correction amount based on IBIS increases therein. Therefore, in section C, the ratio between the shake correction amount based on OIS and the shake correction amount based on IBIS fluctuates, rather than remaining constant.

In addition, in the periphery shake correction method, as the load of calculation of percentages is significantly high compared to the coordinated control method 1, the movable range of the image sensor 106 used with IBIS is limited in order to suppress this load of calculation. For this reason, in the periphery shake correction method, the image stabilization range in a case where OIS and IBIS are driven simultaneously is small compared to the coordinated control method 1. Therefore, in terms of the image stabilization performance, the coordinated control method 1 is more advantageous.

In the coordinated control method 2, which is the same as the coordinated control method 1 in terms of the basic concept, the percentage of the shake correction amount based on OIS is particularly high in consideration of the optical characteristics of the lens. This is because the shake correction remnant at the image periphery portion can be reduced by causing the shake correction amount based on OIS, which undergoes less change with each image height, to occupy a large part.

Provided that a section of the shake amount in which the shake correction amount based on OIS occupies a large part within the maximum movable range of the image stabilization lens 102 driven based on OIS is section D, as it is not possible to perform further image stabilization based on OIS in section E outside section D, only the shake correction amount based on IBIS increases therein. Therefore, in section E, the ratio between the shake correction amount based on OIS and the shake correction amount based on IBIS fluctuates, rather than remaining constant.

First Embodiment

The following describes a first embodiment of the present invention.

Figure 5:
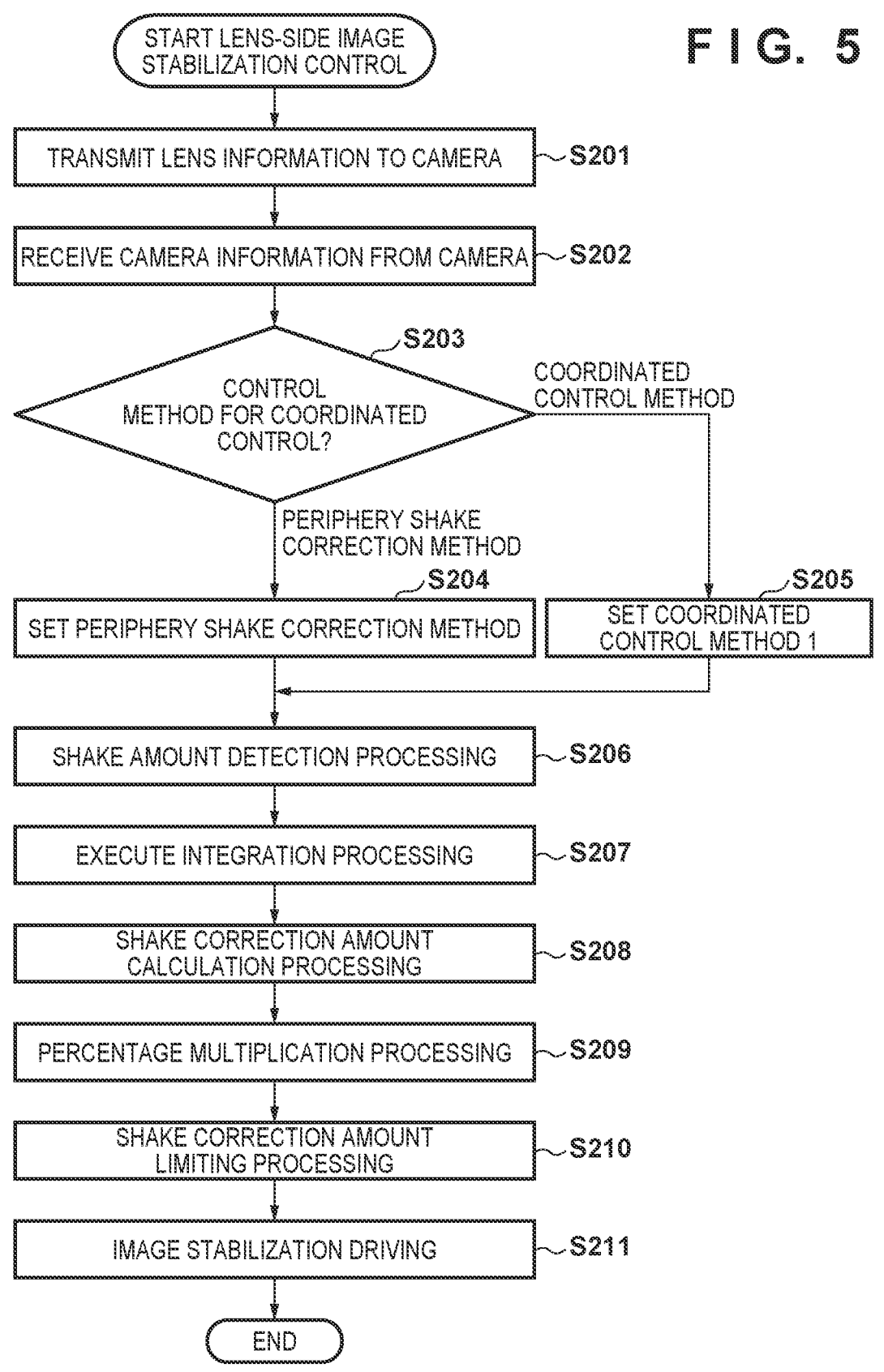
FIG. 5 is a flowchart of lens-side image stabilization control according to the first embodiment.

FIG. 4 and FIG. 5 are flowcharts showing the flows of image stabilization control performed on the image capturing apparatus with the above-described configuration according to the first embodiment; FIG. 4 is a flowchart of camera-side image stabilization control, and FIG. 5 is a flowchart of lens-side image stabilization control.

First, the camera-side image stabilization control will be described with reference to the flowchart of FIG. 4.

Once the camera-side image stabilization control has been started, in step S101, the camera-side control method determination unit 166 determines whether the lens unit 200 is a lens that is compatible with the periphery shake correction method based on information obtained through initialization communication when the lens unit 200 was attached to the camera main body 100.

In a case where the lens unit 200 is compatible with the periphery shake correction method, processing proceeds to step S102, and the camera-side control method determination unit 166 sets the periphery shake correction method. Consequently, the camera main body 100 starts a preparation for the inverse-correction based on IBIS. On the other hand, in a case where the lens unit 200 is not compatible with the periphery shake correction method, processing proceeds to step S103, and the coordinated control method 1 is set.

In step S104, lens information is received from the lens unit 200. Here, the lens information includes the maximum movable range of the image stabilization lens 102 based on OIS, the maximum percentage of the shake correction amount based on OIS, a range of the shake amount in which the image stabilization lens 102 is moved at the maximum percentage, and the current position of the image stabilization lens 102. These are necessary in percentage calculation when the inverse-correction based on IBIS is performed.

In step S105, camera information, as well as the control method for coordinated control that has been set by the camera-side control method determination unit 166 through processing of steps S101 to S103, is transmitted to the lens unit 200. Here, the camera information includes the maximum movable range of the image sensor 106 based on IBIS, and the current position of the image sensor 106. These are necessary in percentage calculation when the lens unit 200 performs the over-correction based on OIS.

In step S106, whether to start still image shooting is determined. In a case where still image shooting is to be started, a shake amount is obtained from the camera-side shake detection unit 134 in step S107. At this time, a unit of the shake amount is an angular velocity. Then, in step S108, the camera-side integration unit 161 executes integration processing with respect to the shake amount, and converts the angular velocity into an angle (a shake angle).

In step S109, the camera-side shake correction amount calculation unit 162 obtains a shake correction amount with which the shake angle is cancelled out in consideration of the frequency band of the shake angle and the range in which the image sensor 106 can be driven. Then, in step S110, the camera-side percentage multiplication unit 163 multiplies the obtained shake correction amount by the percentage calculated based on the control method for coordinated control set by the camera-side control method determination unit 166. In the case of the periphery shake correction method, the percentage of IBIS has a negative value in a range in which the detected shake angle is smaller than a predetermined value (the ranges A and B in FIG. 3A), although it depends on the magnitude of the shake angle.

In step S111, in a case where the shake correction amount exceeds the range in which the image sensor 106 can be driven, the camera-side driving range limit unit 164 executes processing for limiting the shake correction amount in the range in which the image sensor 106 can be driven. Then, in step S112, the camera-side PID control unit 165 performs feedback control with respect to the image sensor 106.

On the other hand, in a case where still image shooting is not to be started in step S106, feedback control is performed so that the image sensor 106 is held at the center position in step S113.

Then, after the feedback control in step S112 or S113 has been ended, the camera-side image stabilization control is ended.

Next, the lens-side image stabilization control will be described with reference to the flowchart of FIG. 5.

First, lens information is transmitted to the camera main body 100 in step S201, and camera information, as well as the control method for coordinated control that has been set by the camera-side control method determination unit 166 through processing of the aforementioned steps S101 to S103, is received from the camera main body 100 in step S202.

Then, in accordance with the control method for coordinated control obtained in step S203, one of the periphery shake correction method and the coordinated control method 1 is set in step S204 or S205.

In step S206, the lens-side shake detection unit 125 obtains a shake amount. At this time, a unit of the shake amount is an angular velocity. Then, in step S207, the lens-side integration unit 151 executes integration processing with respect to the shake amount, and converts the angular velocity into an angle (a shake angle).

In step S208, the lens-side shake correction amount calculation unit 152 obtains a shake correction amount with which the shake angle is cancelled out in consideration of the frequency band of the shake angle and the range in which the image stabilization lens 102 can be driven. Then, in step S209, the lens-side percentage multiplication unit 153 multiplies the obtained shake correction amount by the percentage calculated based on the control method for coordinated control set in step S204 or S205. In the case of the periphery shake correction method, the percentage of correction based on OIS exceeds 100% of the correction amount in a range in which the detected shake angle is smaller than the predetermined value (the ranges A and B in FIG. 3A), although it depends on the magnitude of the shake angle.

In step S210, in a case where the shake correction amount exceeds the range in which the image stabilization lens 102 can be driven, the lens-side driving range limit unit 154 executes processing for limiting the shake correction amount in the range in which the image stabilization lens 102 can be driven. Then, the image stabilization lens PID control unit 155 executes feedback control with respect to the image stabilization lens 102 in step S211, and the lens-side image stabilization control is ended.

Note that in order to make maximum use of IBIS, which tends to have a small movable range during coordinated control, at the time of exposure, OIS does not remain at the central position, except for a case where the photographer intentionally turns OFF its image stabilization function. Therefore, the lens-side image stabilization control does not include branching processing that depends on the start of still image shooting, like step S106 of FIG. 4 in the camera-side image stabilization control.

On the other hand, in the camera-side image stabilization control, the image sensor is held at the central position in step S113 before still image shooting is started in step S106. In this way, at the start of still image shooting, the shake correction range based on IBIS can be utilized to the maximum extent; in addition, at the start of still image shooting, as there is no need to restore the image sensor 106 to the central position, vibration caused by the movement of the image sensor 106 can be removed.

As described above, the first embodiment makes it possible to perform coordinated control for image stabilization with which the lens unit is compatible.

Note that although the above has described a case where the control method for coordinated control is determined by the camera main body 100, the present invention is not limited to this, and the control method for coordinated control may be set by the lens unit 200. In this case, the lens unit 200 may be provided with a control method determination unit equivalent to the camera-side control method determination unit 166, execute processing of steps S101 to S103 in FIG. 4, and notify the camera main body 100 of the set content. As the lens unit 200 recognizes whether it is a lens that is compatible with the periphery shake correction method or a lens that is not compatible with the same, it can make the determination by itself at the time of activation of the image capturing apparatus.

Second Embodiment

Next, a second embodiment of the present invention will be described. The second embodiment will be described in relation to a case where the control method for coordinated control is selected further in accordance with a shutter method and a shutter speed.

In the electronic front curtain shutter method, when the shutter speed is high-speed (e.g., an exposure period shorter than ¹⁄₁₀₀₀ seconds), the slit width is small while a slit is moving. Therefore, if shooting is performed in a state where the image sensor 106 has not been restored to the base state in the pitch direction, yaw direction, and roll direction (a state where it is at the central position with no inclination), exposure unevenness occurs.

Furthermore, when the shutter speed is high-speed, as the influence of a camera shake is minor, an image that appears less strange can be generated by performing image stabilization control that alleviates exposure unevenness. As the occurrence of exposure unevenness is mainly attributed to the arrangement of the image sensor 106, in coordinated control based on OIS and IBIS, IBIS is influenced in association with a shutter method and a shutter speed for shooting.

Furthermore, as described above, in the case of the electronic front curtain shutter method, it may be necessary to restore the image sensor 106 based on IBIS to the aforementioned base state depending on the exposure period, and the percentages of the shake correction amounts based on OIS and IBIS undergo steep fluctuations at the time of restoration to the central position. This gives rise to the problem that, for example, feeling of vibration in the hands degrades the usability of the image capturing apparatus and causes shake.

FIG. 6 is a schematic diagram for describing the negative effects of an operation to restore the image sensor 106 based on IBIS to the central position, in connection with each of the coordinated control methods illustrated in FIGS. 3A and 3B.

In the example of the coordinated control method 1 shown in FIG. 6, when the image sensor 106 moves to the central position based on IBIS, the percentage of IBIS changes from 50% to 0%, and the percentage of OIS changes from 50% to 100%, in terms of the shake correction amount.

In the example of the periphery shake correction method, in the range in which the largest over-correction is performed based on OIS, a large inverse-correction is performed based on IBIS in correspondence therewith. Therefore, in terms of the shake correction amount, the percentage of IBIS changes from –100% to 0%, and the percentage of OIS changes from 200% to 100%. In this way, the changes are more significant than those with the coordinated control method 1.

In the example of the coordinated control method 2, as OIS is preferentially driven, in the range in which the limit of the driving range of the image stabilization lens 102 has not been reached, the percentage of IBIS changes from 10% to 0%, and the percentage of OIS changes from 110% to 100%, in terms of the shake correction amount.

As described above, especially in the case of the periphery shake correction method, when a high shutter speed is used with the electronic front curtain shutter method, the operation of restoring the image sensor 106 to the center for the purpose of alleviating exposure unevenness may impair the usability of the image capturing apparatus and cause shake.

In view of this, according to the second embodiment, the control method for coordinated control is changed in accordance with a shutter method and a shutter speed.

FIG. 7 is a flowchart of the camera-side image stabilization control according to the second embodiment.

FIG. 7 shows the camera-side image stabilization control (IBIS) according to the second embodiment, which is processing of FIG. 4 with processing of steps S301 and S302 added thereto. As other processing is similar to processing of FIG. 4, it is given the same step numerals thereas, and a description thereof is omitted.

If it is determined that the lens unit 200 is compatible with the periphery shake correction method in step S101, whether the shutter method is the electronic front curtain shutter method is determined in step S301. In a case where the shutter method is not the electronic front curtain shutter method, that is to say, in a case where the shutter method is the mechanical shutter method or the electronic shutter method, the periphery shake correction method is set in step S102 because, even if the periphery shake correction method is used, there is no concern that exposure unevenness occurs depending on the shutter speed.

On the other hand, in a case where the shutter method is the electronic front curtain shutter method, processing proceeds to step S302, and whether the shutter speed is longer than a preset threshold Th1 is determined. Note that a shutter speed that makes exposure unevenness easily noticeable can be set as the threshold Th1. In a case where the shutter speed is longer than the preset threshold Th1, as exposure unevenness is not noticeable even if it occurs, processing proceeds to step S102 and the periphery shake correction method is set. In a case where the shutter speed is equal to or shorter than the preset threshold Th1, as there is a possibility that exposure unevenness occurs with the periphery shake correction method, processing proceeds to step S103 and the coordinated control method 1 is set.

Note that as the lens-side image stabilization control is similar to the one described with reference to FIG. 5, a description thereof is omitted.

As described above, the second embodiment makes it possible to, in addition to achieving the advantageous effects of the first embodiment, perform coordinated control for image stabilization that is more appropriate for shooting conditions by changing the coordinated control method in accordance with the shutter method and the shutter speed.

Note that although the above has described a case where the control method for image stabilization is determined by the camera main body 100, the present invention is not limited to this, and the control method for image stabilization may be set by the lens unit 200. In this case, the lens unit 200 may be provided with a control method determination unit equivalent to the camera-side control method determination unit 166, execute processing of steps S101 to S103 in FIG. 7, and notify the camera main body 100 of the set content.

Third Embodiment

Next, a third embodiment of the present invention will be described. The third embodiment will be described in relation to a case where continuous shooting of still images is performed.

As described above, in the case of the electronic front curtain shutter method, it may be necessary to hold the image sensor 106 based on IBIS at the central position depending on the exposure period. Especially, during a mode for continuously shooting still images, in a case where it is necessary to perform an operation to restore the image sensor 106 to the central position between frames, the percentages of the shake correction amounts based on OIS and IBIS undergo steep fluctuations at the time of restoration to the central position. This gives rise to the problem that, for example, feeling of vibration in the hands degrades the usability of the image capturing apparatus and causes shake.

Figure 9:
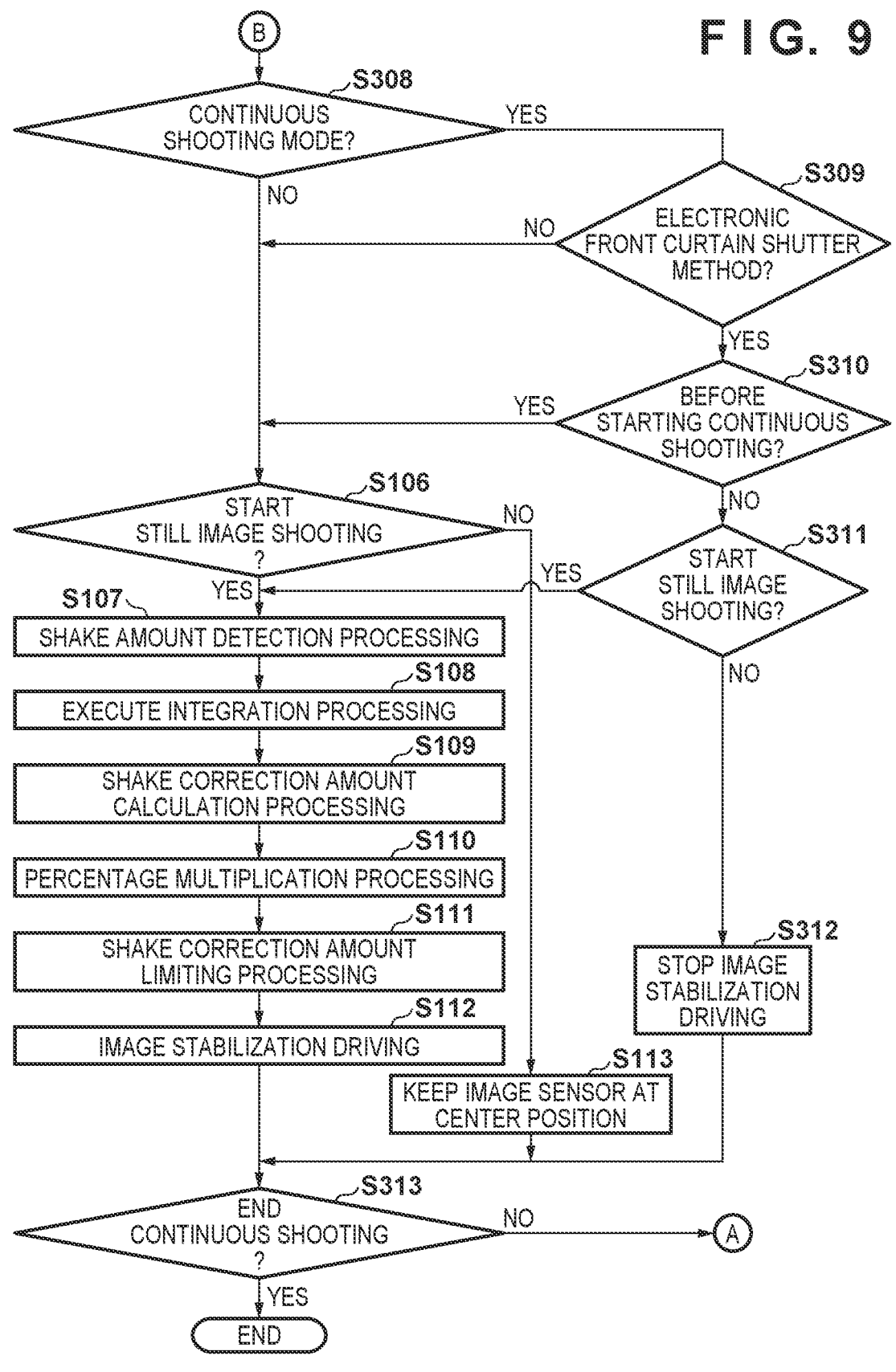
FIG. 9 is a flowchart of the camera-side image stabilization control according to the third embodiment.

FIG. 8 and FIG. 9 show the camera-side image stabilization control according to the third embodiment, which is control that takes the aforementioned problem into account. Note that in FIG. 8 and FIG. 9, processing that is similar to processing of FIG. 4 and FIG. 7 is given the same reference numerals thereas, and a description thereof is omitted as appropriate.

If it is determined that the lens unit 200 is compatible with the periphery shake correction method in step S101, whether the shutter method is the electronic front curtain shutter method is determined in step S301. In a case where the shutter method is not the electronic front curtain shutter method, that is to say, in a case where the shutter method is the mechanical shutter method or the electronic shutter method, processing proceeds to step S304, and whether the focal length is equal to or shorter than a predetermined value is determined.

In a case where the focal length is equal to or shorter than the predetermined value, that is to say, on the wide-angle side, as the luminance difference between the opposing corners at the periphery of the screen ("shading"), which occurs as a result of driving of the image sensor 106, becomes noticeable, processing proceeds to step S102, and the periphery shake correction method is set.

On the other hand, in a case where the focal length is longer than the predetermined value, that is to say, on the telephoto side, as the luminance difference between the opposing corners at the periphery of the screen ("shading") tends to be unnoticeable, processing proceeds to step S103, and the coordinated control method 1 is set.

On the other hand, in a case where it is determined that the shutter method is the electronic front curtain shutter method in step S301, whether a continuous shooting mode is in effect is determined in step S303.

In the case of the continuous shooting mode, processing proceeds to step S305, and whether the shutter speed is longer than a preset threshold Th1 is determined. In a case where the shutter speed is equal to or shorter than the preset threshold Th1, processing proceeds to step S307, image stabilization is performed by driving only OIS, and IBIS is set to be in the base state (the central position). By performing such control, the occurrence of exposure unevenness can be suppressed. Although the image stabilization effects are diminished because coordinated control is not performed, as the influence of image shake is small at the high shutter speed, the decrease in the image stabilization effects is limited.

On the other hand, in a case where the shutter speed is longer than the preset threshold Th1, the coordinated control method 2 is set in step S306. This is because, in the case of the electronic front curtain shutter method, it is necessary to restore the image sensor 106 to the central position before the start of exposure between frames, as with the setting in step S307, depending on the next exposure period during continuous shooting. As there is a problem that vibration is felt by the hands if steep percentage fluctuations occur at the time of restoration to the central position as stated earlier, the distance of restoration to the central position is shortened by setting the coordinated control method 2.

On the other hand, in a case where it is determined that the continuous shooting mode is not in effect in step S303, that is to say, in the case of a single shooting mode, processing proceeds to step S302, and whether the shutter speed is longer than the preset threshold Th1 is determined.

In a case where the shutter speed is longer than the preset threshold Th1, processing proceeds to step S304, and the aforementioned control corresponding to the focal length is performed. On the other hand, in a case where the shutter speed is equal to or shorter than the preset threshold Th1, as there is a possibility that exposure unevenness occurs with the periphery shake correction method, processing proceeds to step S103, and the coordinated control method 1 is set.

Once the control method for image stabilization has been set in one of steps S102, S103, S306, and S307, processing proceeds to step S104.

Thereafter, in step S308 of FIG. 9, whether the continuous shooting mode is in effect is determined. In a case where the continuous shooting mode is not in effect, processing proceeds to step S106; in the case of the continuous shooting mode, processing proceeds to step S309.

In step S309, whether the shutter method is the electronic front curtain shutter method is determined; processing proceeds to step S106 in a case where the shutter method is not the electronic front curtain shutter method, that is to say, in a case where the shutter method is the mechanical shutter method or the electronic shutter method, and processing proceeds to step S310 in the case of the electronic front curtain shutter method.

In step S310, whether continuous shooting is yet to be started is determined; if continuous shooting is yet to be started, processing proceeds to step S106, and if continuous shooting has already been started, processing proceeds to step S311, and whether to start shooting of the next still image is determined. In a case where shooting of the next still image is to be started, processing proceeds to step S107.

On the other hand, in a case where shooting of the next still image is not to be started, that is to say, during a transition between frames, the image stabilization operation is performed based on OIS alone in step S312 in a state where the image sensor 106 based on IBIS remains at the last position at the time of exposure for the first image.

Then, whether continuous shooting has been ended is determined in step S313; if continuous shooting has not been ended, processing returns to step S101 of FIG. 8, and if continuous shooting has been ended, the image stabilization control is ended.

Note that as the lens-side image stabilization control is similar to the one described with reference to FIG. 5, a description thereof is omitted.

FIG. 10 is a diagram showing an example of control for a case where continuous shooting is performed when the shutter method is the electronic front curtain shutter mode; it especially shows, for example, control in continuous shooting in which the shutter speed fluctuates during bracketed shooting and the like, and a horizontal axis therein represents time.

First, in a state before continuous shooting, although the image stabilization operation based on OIS is continued, the image sensor 106 is held at the central position (step S113), and the image stabilization operation based on IBIS is not performed. This is because the movable range for image stabilization tends to be smaller with IBIS than with OIS, and the image sensor remains at the central position so that the movable range can be utilized to the maximum extent at the time of exposure.

In shooting of the first image, in a case where the shutter speed is longer than a preset shutter speed (e.g., $\frac{1}{1000}$ seconds) (YES of steps S301, S303, and S305), OIS and IBIS are controlled using the coordinated control method 2. In this case, performing coordinated control using the coordinated control method 2 can increase the image stabilization effects, and furthermore, as the increased shutter speed causes exposure unevenness to be uniform even with the electronic front curtain shutter method, exposure unevenness is not noticeable.

Between shooting sessions (between frames) during the continuous shooting mode (NO of step S311), in order to refrain from performing the image stabilization operation based on IBIS for the same reason as before shooting of the first image, the image stabilization operation based on OIS is performed in a state where the image sensor 106 remains at the last position at the time of exposure for the first image (step S312).

Then, in a case where the exposure period for the second image is equal to or shorter than the preset shutter speed (e.g., equal to or shorter than 1/1000 seconds) (YES of steps S301 and S303, and NO of step S305), the image sensor 106 based on IBIS is restored to the central position for the aforementioned reason so as to prevent the occurrence of exposure unevenness. At this time, the image stabilization operation is performed using OIS alone.

After shooting, OIS continues the image stabilization operation as is, while IBIS keeps remaining at the central position (base position).

As described above, the third embodiment makes it possible to perform control with an image stabilization method that is more appropriate for shooting conditions at the time of continuous shooting of still images.

Note that although the third embodiment has been described above in relation to a case where the control method for image stabilization is set by the camera main body 100, the present invention is not limited to this, and the control method for image stabilization may be set by the lens unit 200. In this case, the lens unit 200 may be provided with a control method determination unit equivalent to the camera-side control method determination unit 166, execute processing indicated by steps S101 to S307 in FIG. 8, and notify the camera main body 100 of the set content. As a result, in a case where an operation member for the zoom lens is provided in the lens unit 200, it is possible to eliminate the need to notify the camera main body 100 of the focal length for the purpose of setting the control method for image stabilization. Also, each of the camera main body 100 and the lens unit 200 may determine the control method for image stabilization. In this case, it is not necessary to give notice of the set content.

Furthermore, the first to the third embodiments have been described above in relation to a case where each of the camera main body 100 and the lens unit 200 obtains the shake correction amounts that are respectively based on IBIS and OIS. However, one of the camera main body 100 and the lens unit 200 may obtain the shake correction amounts; in this case, a configuration in which IBIS and OIS are notified of the obtained shake correction amounts may be provided.

Other Embodiments

Note that the present invention may be applied to a system composed of a plurality of devices, or may be applied to an apparatus made up of one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-137103, filed Aug. 30, 2022 which is hereby incorporated by reference herein in its entirety.

What is claimed is:

1. An image stabilization control apparatus that performs image stabilization by controlling a first driver and a second driver, the first driver correcting camera shake by driving a correction lens included in an imaging optical system in a direction perpendicular to an optical axis, the second driver correcting camera shake by driving an image sensor in a direction perpendicular to the optical axis, the image sensor photoelectrically converting light incident via the imaging optical system and outputting an image signal, the image stabilization control apparatus comprising:

at least one processor or circuit programmed to function as:

an obtainment unit that obtains a shake amount from a detection unit;

a selection unit that selects one of a plurality of control methods including a first control method and a second control method that is different from the first control method; and a calculation unit that obtains a correction amount of at least one of the first driver and the second driver based on the shake amount and on the control method selected by the selection unit, wherein the first control method is a method which performs an over-correction using the first driver in which a correction is made in excess of the shake amount within a range in which the first driver can be driven, and which also performs an inverse-correction using the second driver for cancelling out an amount that has been over corrected, and the selection unit makes the selection in accordance with whether the imaging optical system is compatible with the first control method.

2. The image stabilization control apparatus according to claim 1, wherein the selection unit selects the first control method in a case where the imaging optical system is compatible with the first control method, and selects the second control method in a case where the imaging optical system is not compatible with the first control method.

3. The image stabilization control apparatus according to claim 1, wherein the selection unit makes the selection further in accordance with a shutter method and a shutter speed of the image sensor.

4. The image stabilization control apparatus according to claim 3, wherein the selection unit, in a case where the imaging optical system is compatible with the first control method, selects the first control method in a case where the shutter method is not an electronic front curtain shutter method which starts exposure for the image sensor through reset scanning of the image sensor, and which ends the exposure by moving a rear curtain of a shutter and blocking light from the image sensor, selects the first control method in a case where the shutter method is the electronic front curtain shutter method and the shutter speed is longer than a preset threshold, and selects the second control method in a case where the shutter method is the electronic front curtain shutter method and the shutter speed is equal to or shorter than the threshold.

5. The image stabilization control apparatus according to claim 1, wherein the selection unit makes the selection further in accordance with a shutter method of the image sensor and a focal length of the imaging optical system.

6. The image stabilization control apparatus according to claim 5, wherein the selection unit, in a case where the imaging optical system is compatible with the first control method and the shutter method is not an electronic front curtain shutter method which starts exposure for the image sensor through reset scanning of the image sensor, and which ends the exposure by moving a rear curtain of a shutter and blocking light from the image sensor, selects the first control method in a case where the focal length is equal to or shorter than a preset value, and selects the second control method in a case where the focal length is longer than the preset value.

7. The image stabilization control apparatus according to claim 1, wherein the selection unit makes the selection further in accordance with a shutter method, a shutter speed of the image sensor, and whether or not a mode for performing continuous shooting of still images is in effect.

8. The image stabilization control apparatus according to claim 7, wherein the plurality of control methods further include a third control method and a fourth control method, in a case where the imaging optical system is compatible with the first control method, the shutter method is an electronic front curtain shutter method which starts exposure for the image sensor through reset scanning of the image sensor, and which ends the exposure by moving a rear curtain of a shutter and blocking light from the image sensor, and the mode for performing the continuous shooting is in effect, the selection unit selects the third control method in a case where the shutter speed is longer than a preset threshold, and selects the fourth control method in a case where the shutter speed is equal to or shorter than the threshold,

wherein the third control method is a method that causes the first driver to correct the shake amount in priority to the second driver, and wherein the fourth control method is a method which drives the first driver, and in which the second driver is held at a preset base position.

9. The image stabilization control apparatus according to claim 7, wherein in a case where the selection unit makes the selection further in accordance with a focal length of the imaging optical system, the imaging optical system is compatible with the first control method, the shutter method is an electronic front curtain shutter method which starts exposure for the image sensor through reset scanning of the image sensor, and which ends the exposure by moving a rear curtain of a shutter and blocking light from the image sensor, and the mode for performing the continuous shooting is not in effect, the selection unit selects the second control method in a case where the shutter speed is equal to or shorter than a preset threshold, selects the first control method in a case where the shutter speed is longer than the threshold and the focal length is equal to or shorter than a preset value, and selects the second control method in a case where the shutter speed is longer than the threshold and the focal length is longer than the preset value.

10. The image stabilization control apparatus according to claim 1, wherein the at least one processor or circuit is further programmed to function as a notification unit, wherein the calculation unit obtains the correction amount of one of the first driver and the second driver based on the shake amount and on the control method selected by the selection unit, and wherein the notification unit notifies a processor or circuit that obtains a correction amount of the other of the first driver and the second driver of the control method selected by the selection unit.

11. The image stabilization control apparatus according to claim 1, wherein the calculation unit obtains respective correction amounts of the first driver and the second driver based on the shake amount and on the control method selected by the selection unit.

12. An image stabilization control method for performing image stabilization by controlling a first driver and a second driver, the first driver correcting camera shake by driving a correction lens included in an imaging optical system in a direction perpendicular to an optical axis, the second driver correcting camera shake by driving an image sensor in a direction perpendicular to the optical axis, the image sensor photoelectrically converting light incident via the imaging optical system and outputting an image signal, the image stabilization control method comprising:

obtaining a shake amount from a detection unit;

selecting one of a plurality of control methods including a first control method and a second control method that is different from the first control method; and obtaining a correction amount of at least one of the first driver and the second driver based on the shake amount and on the control method selected in the selecting, wherein the first control method is a method which performs an over-correction using the first driver in which a correction is made in excess of the shake amount within a range in which the first driver can be driven, and which also performs an inverse-correction using the second driver, and in the selecting, the selection is made in accordance with whether the imaging optical system is compatible with the first control method.

13. A non-transitory computer-readable storage medium, the storage medium storing a program that is executable by the computer, wherein the program includes program code for causing the computer to perform an image stabilization control method for performing image stabilization by controlling a first driver and a second driver, the first driver correcting camera shake by driving a correction lens included in an imaging optical system in a direction perpendicular to an optical axis, the second driver correcting camera shake by driving an image sensor in a direction perpendicular to the optical axis, the image sensor photoelectrically converting light incident via the imaging optical system and outputting an image signal, the image stabilization control method comprising:

obtaining a shake amount from a detection unit;

selecting one of a plurality of control methods including a first control method and a second control method that is different from the first control method; and obtaining a correction amount of at least one of the first driver and the second driver based on the shake amount and on the control method selected in the selecting, wherein the first control method is a method which performs an over-correction using the first driver in which a correction is made in excess of the shake amount within a range in which the first driver can be driven, and which also performs an inverse-correction using the second driver, and in the selecting, the selection is made in accordance with whether the imaging optical system is compatible with the first control method.

14. The image stabilization control apparatus according to claim 1, wherein the second control method controls a ratio between the shake amount to be corrected by the first driver and the shake amount to be corrected by the second driver.

15. The image stabilization control apparatus according to claim 14, wherein the first control method controls the ratio.

16. The image stabilization control apparatus according to claim 1, wherein the inverse-correction is performed such that an over-corrected amount by the first driver is canceled out.

17. The image stabilization control apparatus according to claim 1, wherein the second control method is a method that corrects the shake amount using a preset ratio for the first driver and the second driver across the range in which the shake amount can be corrected.

18. A camera comprising:

an image sensor that photoelectrically converts light incident via an imaging optical system and outputting an image signal;

a second driver that corrects camera shake by driving the image sensor in a direction perpendicular to an optical axis of the imaging optical system; and at least one processor or circuit programmed to function as:

an obtainment unit that obtains a shake amount from a detection unit;

a selection unit that selects one of a plurality of control methods including a first control method and a second control method that is different from the first control method; and a calculation unit that obtains a correction amount of at least one of a first driver that corrects camera shake by driving a correction lens included in the imaging optical system in a direction perpendicular to the optical axis and the second driver based on the shake amount and on the control method selected by the selection unit, wherein the first control method is a method which performs an over-correction using the first driver in which a correction is made in excess of the shake amount within a range in which the first driver can be driven, and which also performs an inverse-correction using the second driver, and the selection unit makes the selection in accordance with whether the imaging optical system is compatible with the first control method.

* * * * *